United States Patent
Kronfeld et al.

(10) Patent No.: US 9,134,418 B1
(45) Date of Patent: Sep. 15, 2015

(54) WEATHER HAZARD THREAT LEVEL COMPUTATION AND DISPLAY

(71) Applicants: Kevin M. Kronfeld, Cedar Rapids, IA (US); Roy E. Robertson, Marion, IA (US); Gregory J. Koenigs, Cedar Rapids, IA (US)

(72) Inventors: Kevin M. Kronfeld, Cedar Rapids, IA (US); Roy E. Robertson, Marion, IA (US); Gregory J. Koenigs, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 385 days.

(21) Appl. No.: 13/837,538

(22) Filed: Mar. 15, 2013

(51) Int. Cl.
*G01S 13/95* (2006.01)
*G01S 17/95* (2006.01)
*G01W 1/10* (2006.01)
*G01W 1/16* (2006.01)

(52) U.S. Cl.
CPC .............. *G01S 13/953* (2013.01); *G01S 17/95* (2013.01); *G01W 1/10* (2013.01); *G01W 1/16* (2013.01)

(58) Field of Classification Search
CPC ........ G01S 13/953; G01S 17/95; G01W 1/10; G01W 1/16
USPC ................................ 342/26 R–26 D, 176, 191
See application file for complete search history.

(56) References Cited

U.S. PATENT DOCUMENTS

| | | | | |
|---|---|---|---|---|
| 6,456,226 B1* | 9/2002 | Zheng et al. | ................ | 342/26 R |
| 7,129,885 B1* | 10/2006 | Woodell et al. | ............ | 342/26 B |
| 7,733,264 B1* | 6/2010 | Woodell et al. | ............. | 342/26 B |
| 7,868,811 B1* | 1/2011 | Woodell et al. | ............. | 342/26 B |
| 2010/0103029 A1* | 4/2010 | Khatwa et al. | .............. | 342/26 B |
| 2011/0090111 A1* | 4/2011 | Stagliano, Jr. | .............. | 342/26 R |
| 2011/0148692 A1* | 6/2011 | Christianson | ............... | 342/26 B |
| 2011/0148694 A1* | 6/2011 | Bunch et al. | ................ | 342/26 B |

OTHER PUBLICATIONS

Liu et al., "Relationships Between Lightning Flash Rates and Radar Reflectivity Vertical Structures in Thunderstorms Over the Tropics and Subtropics", Journal of Geophysical Research, Published Mar. 27, 2012; vol. 117, D06212, 19 pages.
National Convective Weather Forecast Product Web Training; Accessed on Feb. 4, 2013 from http://www.rap.ucar.edu/projects/ncwf2/hazard.php, 3 pages.

* cited by examiner

*Primary Examiner* — John B Sotomayor
*Assistant Examiner* — Marcus Windrich
(74) *Attorney, Agent, or Firm* — Angel N. Gerdzhikov; Donna P. Suchy; Daniel M. Barbieri

(57) ABSTRACT

A method for computing and displaying a weather hazard threat level for a weather radar system of an aircraft includes receiving weather radar returns from a radar antenna of the weather radar system. The weather radar returns include at least one of horizontal scans and vertical scans. Radar reflectivity may be determined from the weather radar returns, and, for at least one of the horizontal scan data and the vertical scan data, areas of radar reflectivity and a temperature associated with the areas of radar reflectivity may be determined. A lightning flash rate may be estimated using the radar reflectivity, areas of radar reflectivity, and temperature associated with the areas of radar reflectivity. Weather radar information may then be displayed, wherein the weather radar information is adjusted on the display based on the lightning flash rate.

22 Claims, 5 Drawing Sheets

US 9,134,418 B1

WEATHER HAZARD THREAT LEVEL COMPUTATION AND DISPLAY

BACKGROUND

The present invention relates generally to the field of aviation. More specifically, the present disclosure relates to weather hazard detection in an aircraft.

An airborne radar of an aircraft may be configured to detect reflectivity of weather cells in front of the aircraft. In conventional systems, the reflectivity may be processed to determine a severity, hazard, or threat level, or the like, associated with the weather cells (e.g., the reflectivity may be used in a rainfall rate function or other function configured to determine a threat level). The severity or threat level determined may be mapped to a color coding scheme, and the weather cells may be displayed on an aircraft display with the appropriate colors.

However, such systems may not indicate an accurate threat level and convective related threats, such as lightning. Identifying the presence and amount of lightning within a convective cell provides an indication to the severity of the weather cell. Understanding the severity of a weather cell may help flight crews of the aircraft, as the aircraft may fly in close proximity to less severe cells but needs to circumnavigate severe cells to avoid severe convective-related hazards (e.g., lightning, hail, turbulence, etc.). Currently, pilots may either avoid less severe weather cells by too much, making inefficient weather avoidance decisions, or may fly too close to severe cells and encounter hazards. What is needed are systems and methods to better map reflectivity to weather hazards.

It would be desirable to provide a system and/or method that provides one or more of these or other advantageous features. Other features and advantages will be made apparent from the present specification. The teachings disclosed extend to those embodiments which fall within the scope of the appended claims, regardless of whether they accomplish one or more of the aforementioned needs.

SUMMARY

One embodiment of the present disclosure relates to a method for computing and displaying a weather hazard threat level for a weather radar system of an aircraft. The method includes receiving weather radar returns from a radar antenna of the weather radar system, wherein the weather radar returns comprise at least one of horizontal scans and vertical scans. The method further includes determining radar reflectivity from the weather radar returns. The method further includes determining, for at least one of the horizontal scan data and the vertical scan data, areas of radar reflectivity and a temperature associated with the areas of radar reflectivity. The method further includes estimating a lightning flash rate using the radar reflectivity, areas of radar reflectivity, and temperature associated with the areas of radar reflectivity determined using at least one of the horizontal scan data and the vertical scan data. The method further includes displaying weather radar information on a display of the aircraft, wherein the weather radar information is adjusted on the display based on the lightning flash rate.

Another embodiment of the present disclosure relates to a weather radar system for an aircraft. The weather radar system includes a radar antenna and a display configured to display weather radar information. The weather radar system further includes a processing circuit configured to receive weather radar returns from the radar antenna, wherein the weather radar returns include at least one of horizontal scans and vertical scans. The processing circuit is further configured to determine radar reflectivity from the weather radar returns and areas of radar reflectivity and a temperature associated with the areas of radar reflectivity from the at least one of horizontal scan data and vertical scan data. The processing circuit is further configured to estimate a lightning flash rate using the radar reflectivity, areas of radar reflectivity, and temperature. The processing circuit is further configured to adjust the weather radar information on the display based on the lightning flash rate.

Yet another embodiment of the present disclosure relates to a computer-readable medium having instructions stored thereon, the instructions being executable by a processor to implement a method. The method includes receiving weather radar returns from a radar antenna of a weather radar system, wherein the weather radar returns include at least one of horizontal scans and vertical scans. The method further includes determining radar reflectivity from the weather radar returns. The method further includes determining, for at least one of the horizontal scan data and the vertical scan data, areas of radar reflectivity and a temperature associated with the areas of radar reflectivity. The method further includes estimating a lightning flash rate using the radar reflectivity, areas of radar reflectivity, and temperature associated with the areas of radar reflectivity determined using at least one of the horizontal scan data and the vertical scan data. The method further includes displaying weather radar information on a display of the aircraft. The weather radar information is adjusted on the display based on the lightning flash rate.

Alternative exemplary embodiments relate to other features and combinations of features as may be generally recited in the claims.

BRIEF DESCRIPTION OF THE DRAWINGS

The disclosure will become more fully understood from the following detailed description, taken in conjunction with the accompanying figures, wherein like reference numerals refer to like elements, in which.

DETAILED DESCRIPTION OF THE PREFERRED EMBODIMENTS

Before turning to the figures, which illustrate the exemplary embodiments in detail, it should be understood that the application is not limited to the details or methodology set forth in the description or illustrated in the figures. It should also be understood that the terminology is for the purpose of description only and should not be regarded as limiting.

Referring generally to the figures, system and methods for computing and displaying a weather hazard threat level is shown and described. The systems and methods herein are configured to determine a weather hazard threat level by using a relationship between a reflectivity area in weather radar returns and lightning flash rates. In particular, the reflectivity, the area of the reflectivity, and the temperature may be used to determine a lightning flash rate. As reflectivity increases, an area of reflectivity increases, and there is a corresponding increase in the lightning flash rate at a given temperature. As a temperature in the areas of reflectivity decreases (e.g., as one goes higher in the atmosphere), there may be a corresponding increase in lightning flash rates. This statistical relationship between reflectivity and lightning may be used to compute a lightning flash rate with a high degree of confidence. This may allow a weather radar system to better estimate a weather hazard threat level.

In the embodiments of the present disclosure, the weather radar returns may include horizontal scan data and vertical scan data. The horizontal and vertical sweeps of the radar may be performed in a mixed fashion (e.g., such that one or more horizontal sweeps of the radar are performed, then one or more vertical sweeps of the radar are performed, and so forth). Using horizontal scan data, vertical scan data, or both, an amount of reflectivity may be detected or estimated within the mixed phase region resulting from the horizontal and vertical scans. The estimated reflectivity may then be used as described above to compute a lightning flash rate and a weather hazard threat level.

In one embodiment, using the computed lightning flash rates, an area of high lightning flash rates may be identified as a primary threat region. Additionally, another region surrounding the primary threat region may be identified as a region to avoid traveling through. The systems and methods herein may be used to adjust or qualify a display of weather radar information based on the lightning flash rates and corresponding information (e.g., changing colors of a weather cell in the display, identifying regions of risk, etc.).

Figure 1:
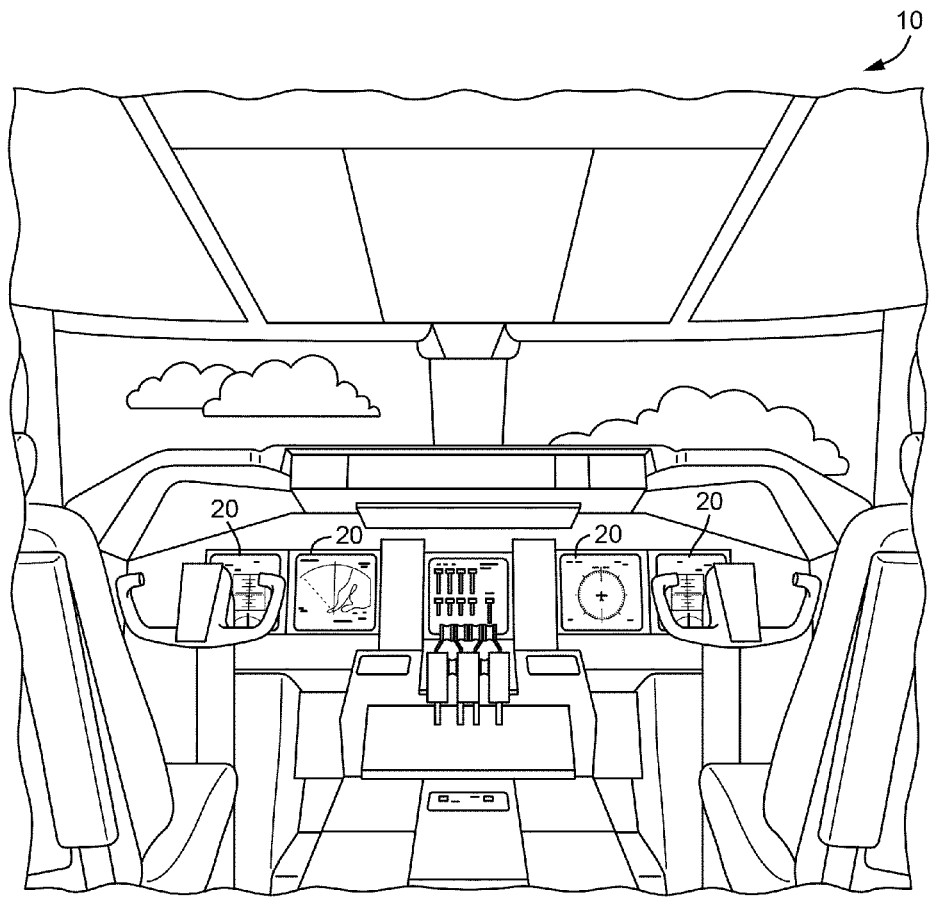
FIG. 1 is an illustration of an aircraft control center, according to an exemplary embodiment.

Referring to FIG. 1, an illustration of an aircraft control center or cockpit 10 is shown according to an exemplary embodiment. Aircraft control center 10 includes flight displays 20 which are generally used to increase visual range and to enhance decision-making abilities. In an exemplary embodiment, flight displays 20 may provide an output from a radar system of the aircraft. For example, flight displays 20 may provide a top-down view, a horizontal view, a vertical profile view, or any other view of weather, terrain, obstacles, and other objects detected by a radar system on the aircraft. The views may include monochrome or color graphical representations of the weather, terrain, obstacles, etc. Graphical representations of weather or terrain may include an indication of altitude of the weather or terrain or the altitude relative to the aircraft. Aircraft control center 10 may further include user interface elements (flashing lights, displays, display elements on a weather radar display, audio alerting devices, etc.) configured to warn the pilot of potentially threatening features such as severe weather, terrain, obstacles, etc.

Figure 2:
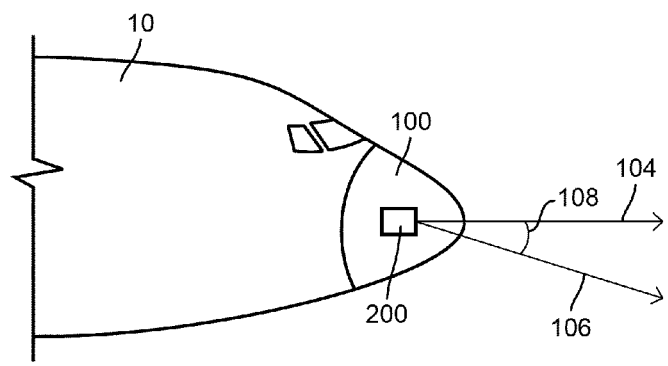
FIG. 2 is an illustration of the nose of an aircraft including a weather radar system, according to an exemplary embodiment.

In FIG. 2, the front of an aircraft is shown with aircraft control center 10 and nose 100 according to an exemplary embodiment. A radar system 200 (e.g., a weather radar system or other radar system) may be located within nose 100 of the aircraft or within aircraft control center 10 of the aircraft. According to various exemplary embodiments, radar system 200 may be located on the top of the aircraft or on the tail of the aircraft instead. Radar system 200 may include or be coupled to an antenna system.

Radar system 200 may generally work by sweeping a radar beam horizontally back and forth across the sky. For example, radar system 200 may conduct a first horizontal sweep 104 directly in front of the aircraft and a second horizontal sweep 106 downward at some tilt angle 108 (e.g., 20 degrees down). Returns from different tilt angles can be electronically merged to form a composite image for display on an electronic display, such as a flight display 20 in aircraft control center 10. Returns can also be processed to, for example, distinguish between terrain, weather, and other objects, to determine the height of terrain, to determine the height of weather, etc. In one embodiment, radar system 200 may be a WXR-2100 MultiScan™ radar system or similar system manufactured by Rockwell Collins. In another embodiment, radar system 200 may be an RDR-4000 system, an IntuVue™ 3-D radar system, or similar system manufactured by Honeywell International, Inc.

Radar system 200 may also sweep a radar beam vertically back and forth. Results from the different vertical tilt angles may be analyzed to determine the characteristics of weather. For example, the altitude, range, and vertical height of weather may be determined using the vertical scan results. These results may be used to form an image for display on an electronic display (e.g., flight display 20, etc.). For example, a vertical profile view of the weather may be generated. The profile may be used by a pilot to determine height, range, hazards and threats, and other relevant information that can be utilized by the pilot to change the course of the aircraft to avoid the detected weather.

Figure 3:
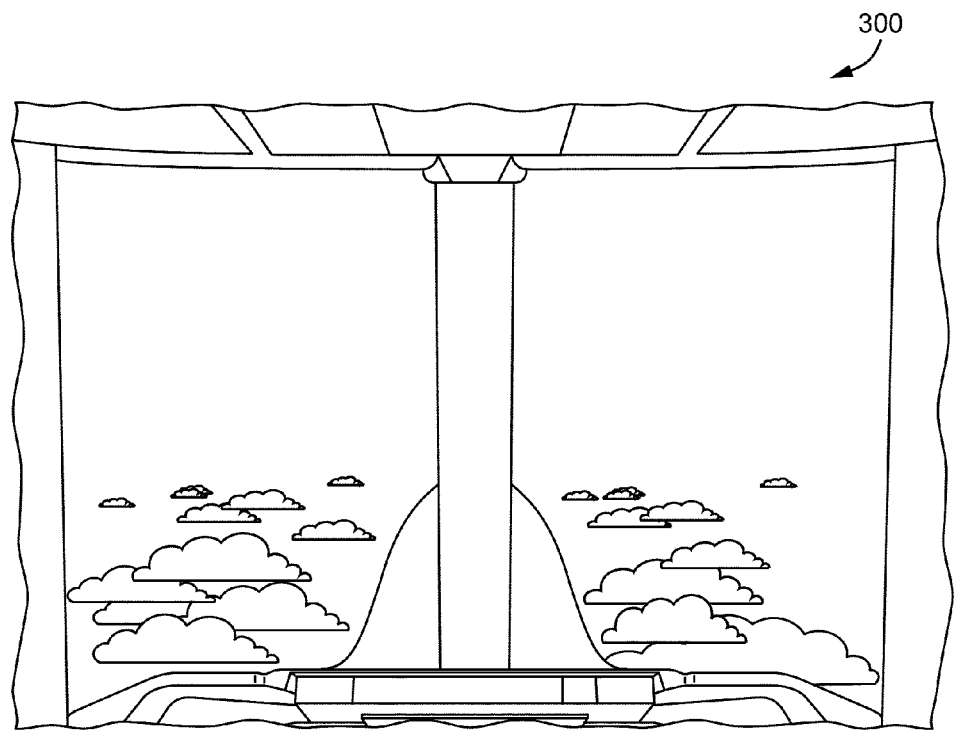
FIG. 3 is an illustration of an environment visible through the front windshield of an aircraft, according to an exemplary embodiment.

Referring now to FIG. 3, an illustration of an environment 300 visible through the front windshield of an aircraft (e.g., a pilot's view when looking out of aircraft control center 10) is shown. Environment 300 may include portions of airspace in which no substantial weather hazards are present and portions of airspace where weather hazards may be present (e.g., clouded areas). However, it may be difficult for a pilot to determine whether actual weather hazards exist, and what the severity of those hazards may be, merely by looking at environment 300 out of the windshield.

Figure 4:
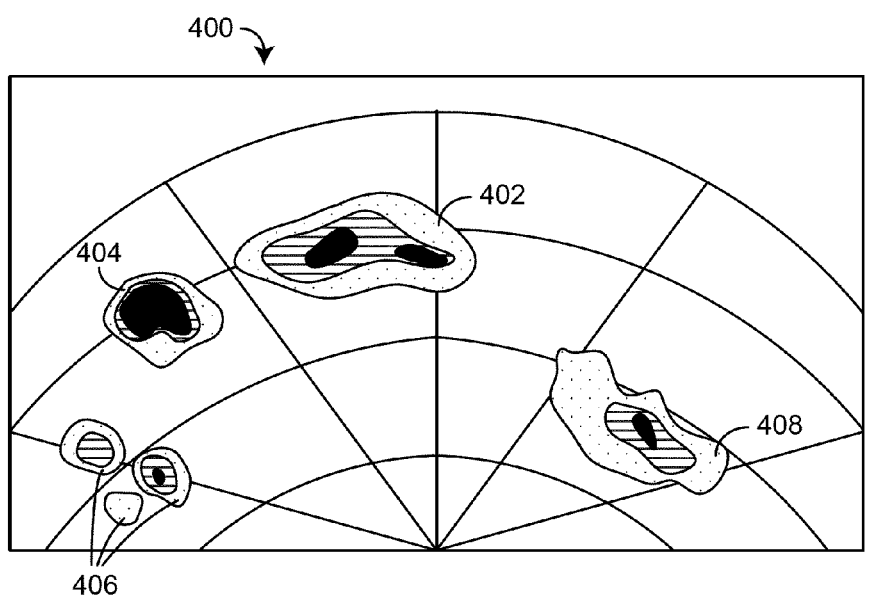
FIG. 4 is a plan view display of weather radar data, according to an exemplary embodiment.

Aircraft may be equipped with weather radar systems to provide further information about potential weather hazards to the pilot. Referring to FIG. 4, an example plan view display of weather radar data is shown. The plan view display image 400 is shown illustrating various weather cells in the vicinity of the aircraft. Display image 400 may provide a pilot with information about the range and bearing from the aircraft to weather cells in proximity to the aircraft. Several weather cells are shown in display image 400 as being proximate to the aircraft, including weather cells 402, 404, 406, and 408.

The data shown in display image 400 may include data generated using a standard scan pattern of a weather radar system (e.g., horizontal sweeps across the environment in front of and/or to the sides of the aircraft). Display image 400 may be provided to a pilot via a display device and may be based on radar-generated reflectivity data (e.g., measured in decibels relative to Z or dBZ). For example, in display image 400, different dBZ levels are illustrated with different patterns and shading (the highest dBZ levels correspond with the darkened areas, lower levels correspond with a dashed or dotted area, etc.). On an aircraft display, different dBZ levels may be illustrated with different colors.

A weather radar system (e.g., radar system 200 of FIG. 5) may be configured to perform detailed analysis of one or more identified weather cells or portions of weather cells (identified via the radar system or manually) to determine further information regarding a hazard posed by the cells. For example, advanced analysis may be performed by the radar system 200 to determine a cell-top altitude (e.g., a highest altitude for the cell) and/or threats contained in the cell, such as lightning, hail, turbulence, etc. In some embodiments, radar system 200 may be configured to conduct the advanced analysis by performing vertical radar sweeps (e.g., sweeping a range of altitudes above and/or below a current altitude of the aircraft) near identified range and bearing targets and/or across a target bearing. In some embodiments, advanced sweeps of certain cells and standard (e.g., horizontal) sweeps may be performed in a mixed fashion (e.g., such that one or more standard sweeps are performed, then one or more advanced tracking scans are performed, then a standard sweep is performed again, etc.). Radar system 200 may be configured to adjust display image 400 based on the analysis of the weather cells. For example, a color of a weather cell displayed on display image 400 may be adjusted to indicate a high or low lightning flash rate associated with the cell, such as weather cell 404 being darkened to indicate a higher weather hazard threat level.

Figure 5:
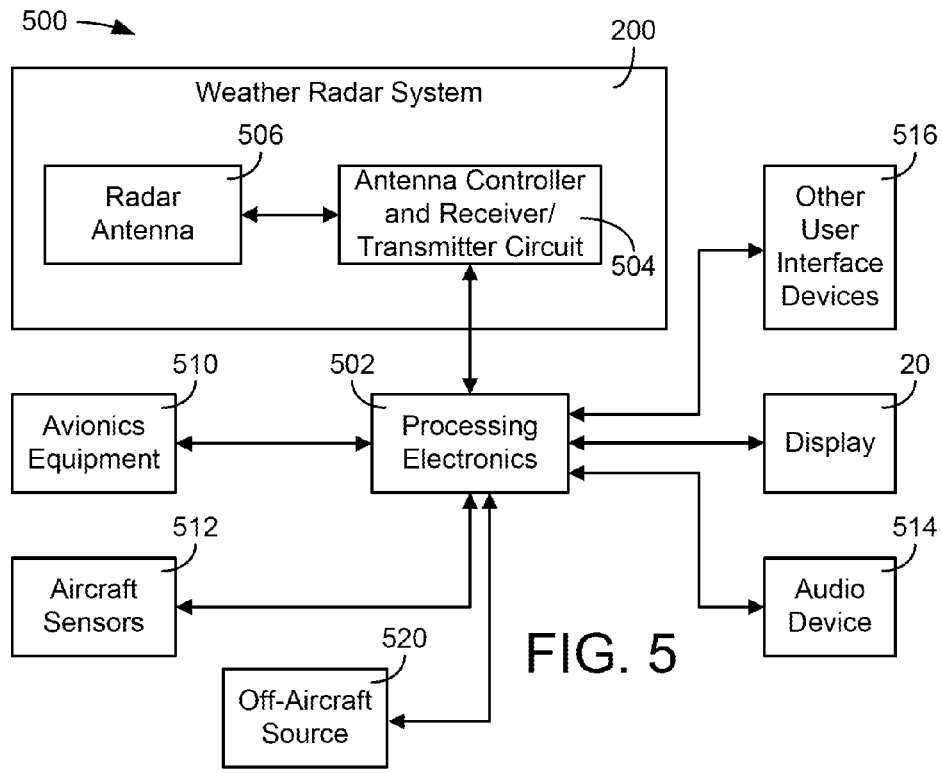
FIG. 5 is a block diagram of a system for providing weather radar data, according to an exemplary embodiment.

Referring now to FIG. 5, a block diagram of a radar control system 500 including weather radar system 200 is shown, according to an exemplary embodiment. Radar system 200 may be installed on the aircraft (e.g., in nose 100 of the aircraft or another location) and may be used by the various detection systems of the aircraft to detect hazardous conditions. For example, radar system 200 may be used to detect the presence of weather, to detect the presence and severity of weather hazards such as lightning, or otherwise.

Radar system 200 is shown to include a radar antenna 506 connected (e.g., directly or indirectly) to an antenna controller and receiver/transmitter circuit 504. Antenna controller and receiver/transmitter circuit 504 may include any number of mechanical or electrical circuitry components or modules for steering a radar beam generated by radar antenna 506. For example, circuit 504 may be configured to mechanically tilt radar antenna 506 in a first direction while mechanically rotating radar antenna 506 in a second direction. In other embodiments, a radar beam may be electronically swept along a first axis and mechanically swept along a second axis. In yet other embodiments, the radar beam may be entirely electronically steered (e.g., by electronically adjusting the phase of signals provided from adjacent apertures in radar antenna 506, etc.). Circuit 504 may be configured to conduct the actual signal generation that results in a radar beam being provided from radar antenna 506 and to conduct the reception of returns received at radar antenna 506.

Radar return data may be provided from circuit 504 to processing electronics 502 for data processing. For example, processing electronics 502 may use the radar return data to determine if a hazardous weather condition has been detected or is likely to exist, and the level of severity of the weather condition. Processing electronics 502 may also be configured to provide control signals or control logic to circuit 504. For example, depending on various inputs, processing electronics 502 may be configured to cause circuit 504 to change behavior or radar beam patterns. In other words, processing electronics 502 may include the processing logic for operating radar system 200.

Processing electronics 502 are further shown in communication with aircraft sensors 512. Sensors 512 may be any number of sensors that measure aircraft parameters related to the state of the aircraft, such as temperature sensors, humidity sensors, infrared sensors, altitude sensors, pressure sensors, fuel gauges, airspeed sensors, throttle position sensors, ground speed sensors, pitot-static tubes, a gyroscope, a global positioning system (GPS), or any other aircraft-mounted sensors that may be used to provide data to processing electronics 502. Sensors 512 (or any other component shown connected to processing electronics 502) may be indirectly or directly connected to the processing electronics 502.

Processing electronics 502 are further shown in communication with avionics equipment 510. In general, avionics equipment 510 may include other electronic control systems in the aircraft, such as a flight management system, a navigation system, a backup navigation system, or another aircraft system configured to provide inputs to processing electronics 502. Processing electronics 502 are additionally shown in communication with display 20, audio device 514, and other user interface devices 516 (e.g., an electronic device that receives input from a user or conveys information to a user). For example, processing electronics 502 may provide weather radar data, information about detected weather hazards, or other radar-related information to display 20. In some cases, processing electronics 502 may also receive input from display 20, audio device 514, or other user interface devices 516. For example, processing electronics 502 may receive a request for a different radar view or updated weather hazard information from display 20 or via a dial in other user interface devices 516.

Processing electronics 502 may determine the motion of detected weather using data received from aircraft sensors 512 (e.g., GPS data, compass data, etc.), avionics equipment 510 (e.g., throttle information, velocity information, etc.), or from radar returns from weather radar system 200. For example, processing electronics 502 may maintain a history of detected weather and compare the data over time to determine the speed, direction, and range of the detected weather. In another example, processing electronics 502 may estimate the speed and direction of the weather using data received from a radar system located remotely from the aircraft. In one embodiments, processing electronics 502 may identify and track a centroid of the weather, in order to determine the motion of the detected weather. In one embodiment, processing electronics 502 may send and/or receive weather information to or from an off-aircraft source 520 (e.g., ground radar, satellite, ground weather processing station, etc.).

Figure 6:
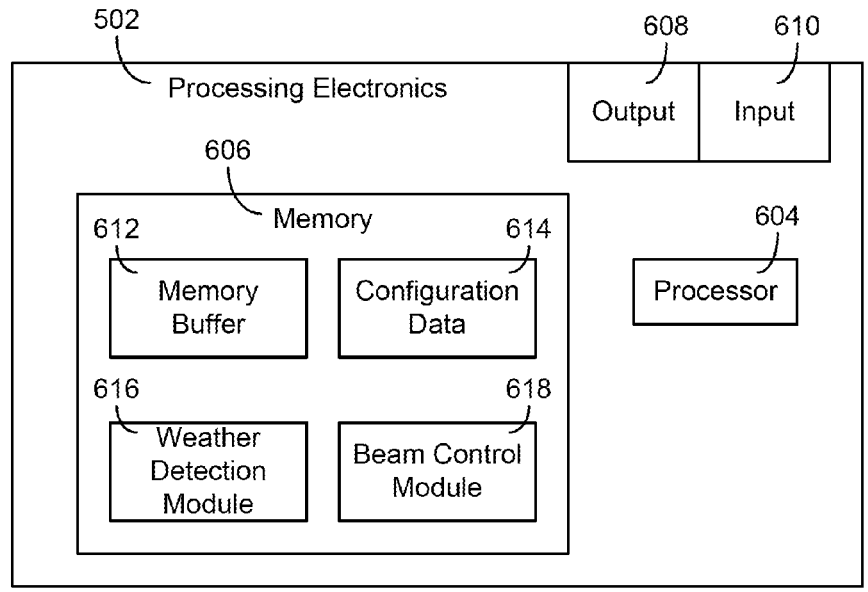
FIG. 6 is a more detailed block diagram of the processing circuit of FIG. 5, according to an exemplary embodiment.

Referring now to FIG. 6, a detailed block diagram of processing electronics 502 of FIG. 6 is shown, according to an exemplary embodiment. Processing electronics 502 includes a processor 604 and memory 606. Processor 604 may be or include one or more microprocessors, an application specific integrated circuit (ASIC), a circuit containing one or more processing components, a group of distributed processing components, circuitry for supporting a microprocessor, or other hardware configured for processing. According to an exemplary embodiment, processor 604 may be configured to execute computer code stored in memory 606 to complete and facilitate the activities described herein. Memory 606 may be any volatile or non-volatile computer-readable medium capable of storing data or computer code relating to the activities described herein. For example, memory 606 is shown to include modules 616, 618 which are computer code modules (e.g., executable code, object code, source code, script code, machine code, etc.) configured for execution by processor 604. When executed by processor 604, processing electronics 502 is configured to complete the activities described herein. Processing electronics 502 includes hardware circuitry for supporting the execution of the computer code of modules 616, 618. For example, processing electronics 502 includes hardware interfaces (e.g., output 608) for communicating control signals (e.g., analog, digital) from processing electronics 502 to circuit 504 and to provide signals to other devices such as display 20, audio devices 514, and other user interface devices 516. Processing electronics 502 also includes an input 610 for receiving, for example, radar return data from circuit 504, feedback signals from circuit 504, or for receiving data from user interface devices (e.g., display 20, other user interface devices 516, etc.) or other systems (e.g., aircraft sensors 512, avionics equipment 510, etc.).

Memory 606 includes a memory buffer 612 for receiving and storing radar return data and other data. For example, weather detection module 618 may access buffer 612 to receive horizontal scan data, vertical scan data, and other weather radar return data. The radar return data stored in memory 606 may be stored according to a variety of schemes or formats (e.g., an x,y or x,y,z format, an x,y,z and time format, a heading-up format, a north-up format, a latitude-longitude format, or any other suitable format for storing spatial or temporal-spatial relative information). Memory buffer 612 may also store airplane parameters related to the operational state of the aircraft received from aircraft sensors 512 or avionics equipment 510.

Memory 606 further includes configuration data 614. Configuration data 614 may include data relating to radar system 200 that is used to affect the operation of radar system 200. For example, configuration data 614 may include beam pattern data which may be data that beam control module 618 may interpret to determine how to command circuit 504 to sweep a radar beam. For example, configuration data 614 may include information regarding maximum and minimum azimuth angles of horizontal radar beam sweeps, timing information, speed of movement information, and the like.

Memory 606 is further shown to include weather detection module 616 which includes logic for using radar returns in memory buffer 612 to conduct one or more determinations relating to weather. For example, weather detection module 616 may be configured to determine a gain level or other display setting for display of the radar returns on a weather radar display (e.g., on display 20). Weather detection module 616 may further be configured to distinguish terrain returns from weather returns. Weather detection module 616 may also determine when weather is hazardous, determine characteristics of detected weather, or conduct any other processing steps (e.g., filtering) relative to the radar return data for providing a display or warning in the aircraft.

Memory 606 is further shown to include beam control module 618. Beam control module 618 may include an algorithm for commanding circuit 504 to sweep a radar beam. Beam control module 618 may be used, for example, to send one or more analog or digital control signals to circuit 504. The control signals may be, for example, an instruction to move the antenna mechanically, an instruction to conduct an electronic beam sweep in a certain way, an instruction to move the radar beam to the left by five degrees, etc. Beam control module 618 may be configured to control timing of the beam sweeps or movements relative to aircraft speed, flight path information, transmission or reception characteristics from radar system 200 or otherwise. Beam control module 618 may receive data from configuration data 614 for configuring the movement of the radar beam. In some embodiments, beam control module 618 may also receive a target value for directing radar sweeps. Beam control module 618 may use the target value to control the direction at which radar sweeps are made.

Figure 7:
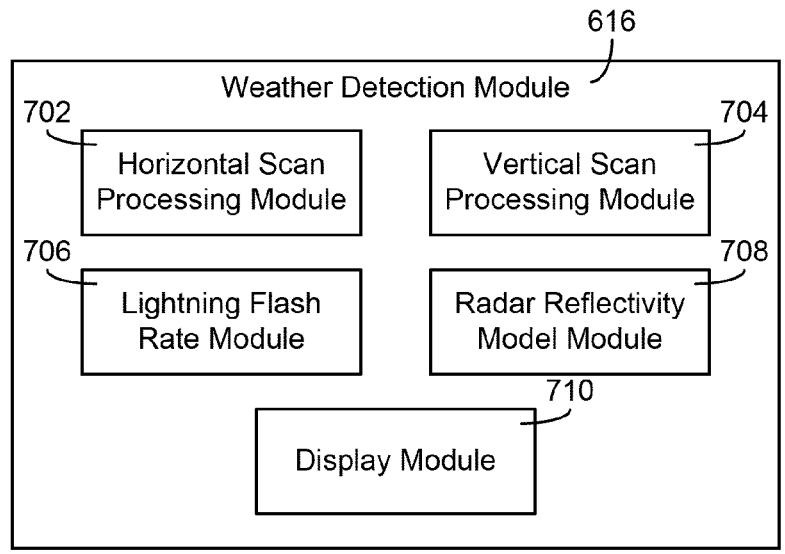
FIG. 7 is a more detailed block diagram of a weather detection module configured to determine a weather hazard threat level, according to an exemplary embodiment.

Referring now to FIG. 7, weather detection module 616 is shown in greater detail. Weather detection module 616 may be configured to detect weather hazards and determine weather hazard threat levels as part of its activities, according to an exemplary embodiment. For example, weather detection module 616 may be configured to determine a lightning flash rate associated with a detected weather cell. Weather detection module 616 is shown to include various modules to detect a possible weather hazard, compute a lightning flash rate, and update a weather radar display based on the lightning flash rate.

Weather detection module 616 may receive weather radar return data from memory buffer 612 via circuit 504. The weather radar return data may generally include horizontal scan data and vertical scan data, and other related information. Weather detection module 616 may be configured to use the radar reflectivity determined using the horizontal scan data and vertical scan data to determine areas of reflectivity. The areas of reflectivity may generally represent detected weather cells.

Weather detection module 616 is shown to include a horizontal scan processing module 702. Horizontal scan processing module 702 may be configured to receive horizontal scan data from memory buffer 612 and to process the data to determine areas of radar reflectivity. For each weather cell (e.g., for each area of reflectivity), an area for various dBZ levels (e.g., decibel levels for reflectivity) may be calculated. For example, a 20 dBZ area contour may be computed which represents an area for which the reflectivity in the area is greater than 20 dBZ. In one embodiment, a 20 dBZ, 30 dBZ, 40 dBZ, and 50 dBZ area contour may be calculated for a given area of reflectivity.

Horizontal scan processing module 702 may receive data from various components of radar control system 500, such as the aircraft's outside temperature, altitude, and direction from equipment 510 and sensor 512, beam shape from beam control module 618, etc. Therefore, for a particular weather cell detected by weather detection module 616, a temperature may be estimated for the area. The various area contours and temperature may be provided to lightning flash rate module 706 for calculating a lightning flash rate. The lightning flash rate may be calculated by one or more mathematical methods, including the mathematical methods described herein. In one embodiment, a confidence value may also be computed for the reflectivity area and temperature and may be provided to lightning flash rate module 706. The confidence level may be statistical description of the reliability of the determined reflectivity area and temperature. The confidence level may be computed based on one or more mathematical/statistical methods.

In one embodiment, in addition to or in place of the area contours and temperature, historical data may be provided to lightning flash rate module 706 for lightning flash rate calculation from horizontal scan processing module 702. Historical data may be data stored in processing electronics 502 (e.g., encoded within the radar system) or received by processing electronics 502. The historical data may be data relating to reflectivity in different weather conditions, and horizontal scan processing module 702 may estimate reflectivity by comparing current weather conditions to the weather conditions stored in the historical data. For example, historical data relating to reflectivity may be categorized by geographic regions or by a time of year. If horizontal scan processing module 702 receives horizontal scan data and other data that indicates a geographic location and a timestamp, a reflectivity may be estimated based on historical data for the geographic location at the same time of year. This reflectivity and corresponding data may then be provided to lightning flash rate module 706.

In one embodiment, historical data may be used if an area of interest (e.g., a weather cell) is detected and the area is not within the mixed phase region or the area is not within a temperature range. Historical data may then be used as an estimate of reflectivity. As an example, if a temperature of an area of reflectivity is determined to be 0 degrees Celsius, an estimate at −15 degrees Celsius may be determined based on the historical data. In one embodiment, the historical data may be used to build a reflectivity model (e.g., a model used to determine what reflectivity would look like in a given situation). A historical weather model may include reflectivity models of various cell types, in different geographic regions and times of year. That information may be used to extrapolate reflectivity between horizontal radar scans and/or reflectivity and higher altitudes above a radar scan and/or lower altitudes below a radar scan.

Weather detection module 616 is shown to include a vertical scan processing module 704. Vertical scan processing module 704 may be configured to receive vertical scan data from memory buffer 612 and to process the data to determine areas of radar reflectivity. Vertical scan processing module 704 may be configured to calculate an area of reflectivity. Using horizontal scan data, individual areas of reflectivity (e.g., individual weather cells) are identified, and a central location of the area may be identified. A vertical scan may then be performed on the particular area or cell (e.g., via a command from beam control module 618). Vertical scan processing module 704 may receive the vertical scan data and sample the data at a preferred temperature level. For example, vertical scan processing module 704 may sample the data for a preferred temperature (e.g., −15 degrees Celsius) or a range (e.g., −10 degrees Celsius to −25 degrees Celsius) at the given area that was scanned.

For the sampled vertical scan data, an area of reflectivity may then be calculated for a given decibel level. For example, if vertical scan processing module 704 wants to calculate an area for the 30 dBZ area contour, the depth of the reflectivity may first be extracted (e.g., by counting the number of range bins in the sampled vertical scan data). In some embodiments, for a horizontal scan, the area for the cell may be calculated by adding all bins for a given cell. Then, an area of reflectivity may be estimated by the following equation:

$$\text{Area}=\pi*(0.5*\text{depth}).$$

The area may then be provided along with the temperature and a confidence level for the reflectivity area and temperature to lightning flash rate module 706. The vertical scan data process is described in greater detail in FIG. 9.

Weather detection module 616 further includes lightning flash rate module 706. Lightning flash rate module 706 may be configured to receive radar reflectivity (measured in dBZ), areas of radar reflectivity, and a temperature associated with the areas of radar reflectivity from modules 702, 704. Lightning flash rate module 706 may further receive historical data (geographic location, timestamp) from module 702. Lightning flash rate module 706 combines the direct information from horizontal scan processing module 702 and the estimated information from vertical scan processing module 704 to estimate the lightning flash rate.

A flash rate may be calculated for an area of reflectivity at a given temperature. In one embodiment, the flash rate may be calculated as the following:

$$\text{FlashRate}=(A*\text{Area})+B.$$

The slope A and the constant B in the above equation may be a slope and constant, respectively, that describe a best fit linear relationship between a flash rate and properties of radar reflectivity in thunderstorms over varying geographic regions. In other words, a linear relationship may be formed between radar reflectivity and a typical lightning flash rate for the radar reflectivity, and the slope A and constant B that fit the linear relationship may be used in the above equation. In other embodiments, different mathematical descriptions of the flash rate may be used. The resulting lightning flash rate may be for a particular area of reflectivity (e.g., a particular weather cell) at a particular temperature.

In various other embodiments, other methods of calculating a flash rate may be used. For example, a mapping process may be used that associates a particular reflectivity at a particular temperature to a lightning flash rate. In some embodiments, the flash rate may be calculated using a volume calculation. The reflectivity for a cell may be integrated (e.g., summed or summed then multiplied by a factor based upon the temperature and/or altitude of reflectivity, etc.) as a function of height, then mapped to a lightning flash rate. A volume of reflectivity may be converted to an integrated liquid estimate, such as Vertically Integrated Liquid, which may also be used to estimate flash rate.

Lightning flash rate module 706 may further include any combining or averaging steps. For example, for all altitudes in a mixed phase region or "sweet spot", a lightning flash rate may be calculated for different temperature levels. The flash rates may then be averaged together to determine an average flash rate for the whole mixed phase region.

As another example, lightning flash rate module 706 may be configured to interpolate between multiple horizontal scans. For two sets of radar reflectivity, areas, and temperatures from two horizontal scans, the scans may be interpolated and then used in a calculation of a single flash rate. As another example, rather than averaging flash rates, a maximum flash rate among all flash rates may be determined and used as the flash rate for the whole weather cell or area. It should be understood that the data received by lightning flash rate module 706 and the flash rates calculated by module 706 may be mathematically combined in various ways without departing from the scope of the present disclosure. In some embodiments, the information may be used to interpolate lightning between horizontal radar scans and extrapolate at higher altitudes above a radar scan or lower altitudes below a radar scan.

The lightning flash rate may be represented in various units. For example, a lightning flash rate may be calculated as the number of flashes in an area in one minute, in ten minutes, or in another period of time. As another example, instead of calculating a lightning flash rate for a particular area of reflectivity (e.g., a particular weather cell), a single lightning flash rate may be calculated for multi-cell weather systems. If there are multiple weather cells within a particular area, a lightning flash rate may be calculated for the entire area or a portion of the area that is larger than an individual weather cell area.

Weather detection module 616 further includes a radar reflectivity model module 708. Module 708 may be configured to receive radar reflectivity information and to store the reflectivity information in a three-dimensional (3-D) or four-dimensional (4-D) model. Radar reflectivity information (including areas of radar reflectivity and temperatures) may be received for both horizontal scan data (from module 702) and vertical scan data (from module 704). The radar reflectivity information may be stored in a 3-D model (three spatial dimensions), which may be used as historical data for module 702 in the future.

The radar reflectivity information may further be stored in a 4-D model (three spatial dimensions and one time dimensions). The 4-D model may be used to predict future flash rates. The future flash rates may be predicted based on the trend of current and previously computed flash rates for a given area of reflectivity (e.g., for a given weather cell). In other words, flash rates for a weather cell may be predicted over time as the weather cell progresses. Further, using the radar reflectivity information, changes in flash rate may be modeled over time and provided to other avionic systems. The future flash rates may then be used to help determine a future weather hazard threat level.

Weather detection module 616 further includes display module 710. Display module 710 may use radar returns in memory buffer 612 to generate one or more views of weather. Weather detection module 616 may also provide generated views to one or more electronic displays, such as display 20. For example, radar returns in memory buffer 612 may be used to generate a plan view of weather. In another example, radar returns in memory 612 from a radar sweep may be used to generate a vertical profile view for display 20. Any number of different views may be generated by weather detection module 616 and provided to display 20.

Display module 710 may receive a lightning flash rate from module 706 and use the flash rate to update display 20. In a weather radar display, color may generally be used to indicate severity of a weather cell. Lightning flash rates may generally be mapped to a color coding scheme. For example, a color coding scheme consistent with a National Weather Service or Federal Aviation Administration (FAA) color coding scheme for flash rates may be used. Adjusting a display of weather based on lightning flash rates is described in greater detail in FIG. 10.

In one embodiment, display module 710 is configured to identify and display a primary threat region (e.g., a region for which there are high lightning flash rates as determined by module 706) and a larger region surrounding the primary threat region. This identification of the larger region (e.g., a general weather hazard threat level region) may be identified such that a pilot of the aircraft may avoid the entire larger region in order to avoid encountering the high lightning flash rates in the primary threat region. Display module 710 may display an indicator to show such regions using any type of color, pattern, or other display setting (e.g., by increasing a color level of a weather cell from yellow to red if at least a portion of the weather cell includes high lightning flash rates, in an embodiment where red indicates a relatively higher hazard threat level than yellow). In some embodiments, display module 710 may display an indicator of the region surrounding the primary threat region using a speckled or dotted indicator, such as a yellow or red speckled region indicator surrounding and/or including the primary threat region.

Figure 8:
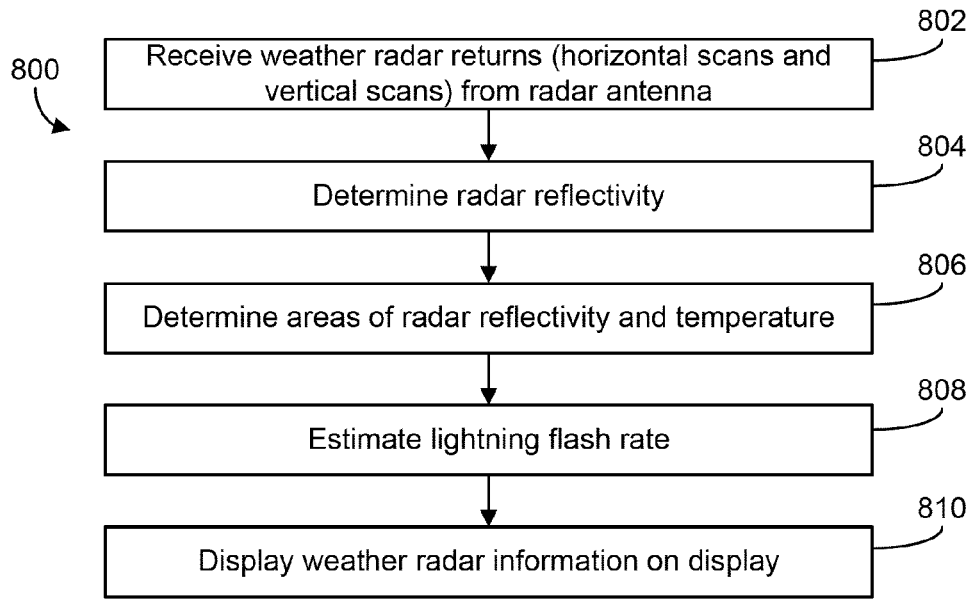
FIG. 8 is a flow chart of a process for weather hazard threat level computation and display, according to an exemplary embodiment.

Referring to FIG. 8, a flow chart of a process 800 for weather hazard threat level computation and display is shown, according to an exemplary embodiment. Process 800 includes receiving weather radar returns from a radar antenna (step 802). The weather radar returns may include horizontal scan data and vertical scan data. In some embodiments, process 800 may include scheduling, completing, and receiving radar returns from a horizontal radar scan. One or more weather cells may be determined based on the horizontal radar scan. Process 800 further includes determining a radar reflectivity using the weather radar returns (step 804) and determining areas of radar reflectivity and temperature associated with the areas of radar reflectivity (step 806) based on the radar reflectivity. For example, step 806 may include identifying areas of reflectivity that represent weather cells. Steps 802-806 may generally include identifying the weather cells and tracking the weather cells from scan to scan. Process 800 may additionally include scheduling, completing, and receiving radar returns from other horizontal and/or vertical radar scans to determine more information about identified weather cells.

Process 800 further includes estimating a lightning flash rate (step 808). The lightning flash rate may be estimated based on the areas of radar reflectivity and temperature determined in step 806, for example. In one embodiment, a flash rate for a particular area of reflectivity at a particular temperature may be given as the following:

FlashRate=($A$*Area)+$B$.

The slope A and the constant B in the above equation may be a slope and constant that describe the best fit linear relationship between a flash rate and properties of radar reflectivity in thunderstorms over varying geographic regions. In other embodiments, different mathematical descriptions of the flash rate may be used. Step 808 may further include any combination or averaging of flash rates. For example, multiple flash rates for an area of reflectivity may be calculated over time and averaged, multiple flash rates for multiple sets of horizontal scan data may be calculated and averaged, or any other type of combination of data may be performed at step 808 to determine an average flash rate, maximum flash rate, etc. In some embodiments, the flash rate may be calculated based on volume and not just an area at a single temperature.

Process 800 includes displaying weather radar information in a display of the aircraft (step 810). Step 810 may generally include displaying weather radar information (e.g., as shown in display image 400 of FIG. 4). Step 810 may further include adjusting the displayed weather radar information based on the lightning flash rate. For example, a display of a weather cell (e.g., the color of the weather cell) may be changed from its original color to a new color based on the lightning flash rate.

Figure 9:
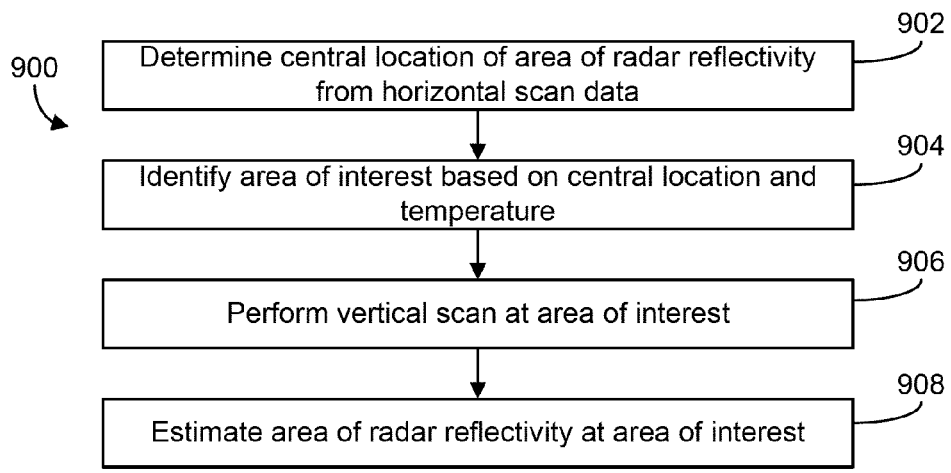
FIG. 9 is a flow chart of a vertical scan data process, according to an exemplary embodiment.

Referring now to FIG. 9, a flow chart of a vertical scan data process 900 is shown, according to an exemplary embodiment. Process 900 may be executed by, for example, vertical scan processing module 704 or another module configured to receive horizontal scan data and vertical scan data and to analyze the data.

Process 900 includes determining a central location of an area of radar reflectivity from the horizontal scan data (step 902). This central location may be a central location of a weather cell of interest (e.g., a weather cell with potential severe weather conditions). Process 900 includes identifying this area of interest based on the central location and temperature information from the horizontal scan data (step 904).

Process 900 includes performing a vertical scan at the area of interest (step 906). For example, beam control module 618 may be configured to control the operation of radar antenna 506 such that the radar performs a vertical sweep of the area of interest. Step 906 may include receiving the resulting vertical scan data for processing.

Process 900 includes estimating an area of radar reflectivity at the area of interest (step 908). Step 908 may generally include sampling the vertical scan data at one or more preferred temperatures, and calculating areas of reflectivity for decibel levels of interest. As an example, step 908 may include calculating an area of radar reflectivity at the 30 dBZ area contour level. First, the depth of the reflectivity at the level may be extracted from the vertical scan data by counting the number of range bins at the 30 dBZ area contour level at the preferred temperature. Then, the area of reflectivity may be calculated as follows:

Area=$\pi$*(0.5*depth)

Figure 10:
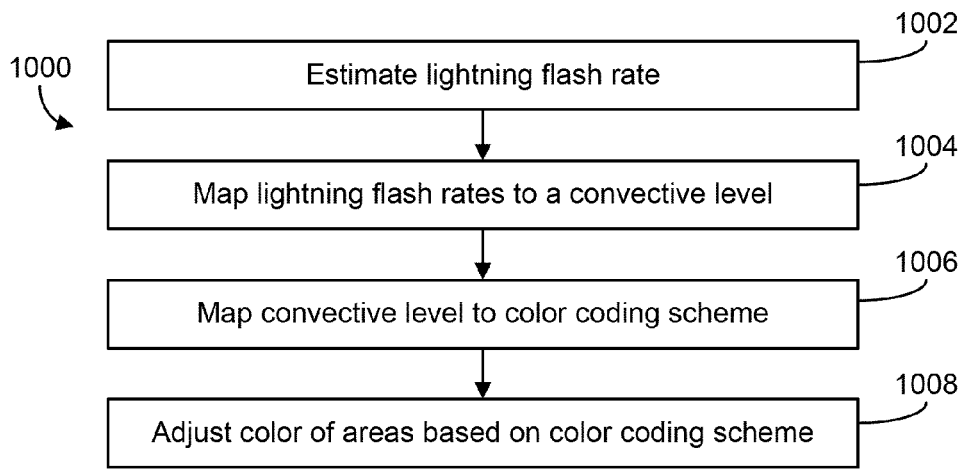
FIG. 10 is a flow chart of a weather hazard threat level display process, according to an exemplary embodiment.

FIG. 10 is a flow chart of a weather hazard threat level display process 1000, according to an exemplary embodiment. Process 1000 may be executed by a display module 710 of a radar control system 500. Process 1000 includes estimating a lightning flash rate (step 1002) and providing the lightning flash rate to a display module for processing.

Process 1000 includes mapping the lightning flash rate to a convective level (step 1004). The convective level may generally relate to a location (geographic location, altitude) at which the weather event (lightning flashes) may occur. The convective level may then be mapped to color coding scheme (step 1006). The convective level may be mapped to a color coding scheme based on various color coding guidelines. One such example of a color coding guideline may be found at: http://www.rap.ucar.edu/projects/ncwf2/hazard.php.

Process 1000 further includes adjusting the color of areas in the display based on the color coding scheme (step 1008). For example, referring to display image 400 of FIG. 4, a color of a weather cell 402, 404, 406, or 408 may be adjusted based on the determination in step 1006. Weather cell 404, mostly darkened in, may indicate a high lightning flash rate, while weather cell 408 with less darkened areas may indicate a low lightning flash rate. Process 1000 may further include adjusting or providing a display based on a confidence level associated with the lightning flash rate or with the radar reflectivity and temperature. Process 1000 may also further include identifying a primary threat region for which there are high lightning flash rates, and a region or area surrounding the primary threat region that may be identified as a high risk area to be avoided by a pilot of the aircraft.

The embodiments of the present disclosure describe a color coding system on a weather radar display to indicate a weather hazard threat level. According to other embodiments, a weather hazard threat level may be indicated by a combination of colors, patterns, symbols, flashing displays, a brightening or darkening of a weather cell or area of the display, or any other modification to the display.

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures may show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A method for computing and displaying a weather hazard threat level for a radar system of an aircraft, comprising:
receiving radar returns from a radar antenna of the radar system via a processing circuit, wherein the radar returns comprise at least one of horizontal radar scan data and vertical radar scan data;
determining radar reflectivity using at least one of the horizontal radar scan data and vertical radar scan data;
determining, using at least one of the horizontal scan data and the vertical scan data, (a) areas of radar reflectivity and (b) a temperature associated with the areas of radar reflectivity;
estimating a lightning flash rate using the radar reflectivity, the areas of radar reflectivity, and the temperature associated with the areas of radar reflectivity;
displaying weather radar information on a display of the aircraft; and
wherein the weather radar information is adjusted on the display based on the lightning flash rate.

2. The method of claim 1, wherein determining, using at least one of the horizontal scan data and the vertical scan data, the areas of radar reflectivity comprises calculating the areas via a bin calculation.

3. The method of claim 1, wherein determining, using at least one of the horizontal scan data and the vertical scan data, the areas of radar reflectivity comprises estimating the areas of radar reflectivity using a reflectivity model based on historical data.

4. The method of claim 1, wherein determining, using at least one of the horizontal scan data and the vertical scan data, the areas of radar reflectivity comprises:
determining a central location of an area of radar reflectivity from the horizontal scan data;

performing a vertical scan at an area of interest, wherein the area of interest is identified based on the central location and a temperature associated with the central location; and estimating an area of radar reflectivity at the area of interest based on a depth value associated with the area of interest.

5. The method of claim 1, wherein estimating the lightning flash rate comprises:
calculating the lightning flash rate using a linear model AX+B, where X is the area of radar reflectivity, A is a slope, and B is constant representative of a relationship between a lightning flash rate and properties of radar reflectivity.

6. The method of claim 1, further comprising storing radar reflectivity in a four-dimensional reflectivity weather model:
wherein the reflectivity weather model is used to estimate a future lightning flash rate.

7. The method of claim 1, further comprising:
calculating statistical confidence values for the areas of radar reflectivity and the temperature associated with the areas of radar reflectivity.

8. The method of claim 1, wherein adjusting the display based on the lightning flash rate comprises:
mapping lightning flash rates to a convective level;
mapping the convective level to a color coding scheme; and
adjusting the color of areas on the display based upon the color coding scheme.

9. The method of claim 1, further comprising:
identifying one or more areas with high lightning flash rates as a primary threat region; and
identifying one or more other areas surrounding the primary threat region as areas with a high weather hazard threat level.

10. The method of claim 9, further comprising:
displaying an indicator on the display showing the area with the high weather hazard threat level.

11. A weather radar system for an aircraft, comprising:
a radar antenna;
a display configured to display weather radar information;
a processing circuit configured to receive weather radar returns from the radar antenna, wherein the weather radar returns comprise at least one of horizontal scan data and vertical scan data;
wherein the processing circuit is configured to determine, using at least one of horizontal scan data and vertical scan data, (a) a radar reflectivity from the weather radar returns, (b) areas of radar reflectivity, and (c) a temperature associated with the areas of radar reflectivity;
wherein the processing circuit is further configured to estimate a lightning flash rate using the radar reflectivity, the areas of radar reflectivity, and the temperature associated with the areas of radar reflectivity; and
wherein the processing circuit is further configured to adjust the weather radar information on the display based on the lightning flash rate.

12. The system of claim 11, wherein the determination of the areas of radar reflectivity using at least one of the horizontal scan data and the vertical scan data comprises calculating the areas via a bin calculation.

13. The system of claim 11, wherein the determination of the areas of radar reflectivity using at least one of the horizontal scan data and the vertical scan data comprises estimating the areas of radar reflectivity using a reflectivity model based on historical data.

14. The system of claim 11, wherein the determination of the areas of radar reflectivity using at least one of the horizontal scan data and the vertical scan data comprises:
determining a central location of an area of radar reflectivity from the horizontal scan data;
performing a vertical scan at an area of interest, wherein the area of interest may be identified based on the central location and a temperature associated with the central location; and
estimating an area of radar reflectivity at the area of interest based on a depth value associated with the area of interest.

15. The system of claim 11, wherein the estimation of the lightning flash rate comprises:
calculating the lightning flash rate using a linear model AX+B, where X is the area of radar reflectivity, A is a slope, and B is constant representative of a relationship between a lightning flash rate and properties of radar reflectivity.

16. The system of claim 11, wherein the processing circuit is further configured to store radar reflectivity in a four-dimensional reflectivity weather model;
wherein the reflectivity weather model is used to estimate a future lightning flash rate.

17. The system of claim 11, wherein the processing circuit is further configured to calculate statistical confidence values for the areas of radar reflectivity and the temperature associated with the areas of radar reflectivity.

18. The system of claim 11, wherein the adjustment of the weather radar information on the display comprises:
mapping lightning flash rates to a convective level;
mapping the convective level to a color coding scheme; and
adjusting the color of areas on the display based upon the color coding scheme.

19. The system of claim 11, wherein the processing circuit is further configured to:
identify one or more areas with high lightning flash rates as a primary threat region; and
identify one or more other areas surrounding the primary threat region as areas with a high weather hazard threat level.

20. The system of claim 19, wherein the processing circuit is further configured to display an indicator on the display showing the area with the high weather hazard threat level.

21. A computer-readable medium having instructions stored thereon, the instructions being executable by a processor to implement a method comprising:
receiving radar returns from a radar antenna of a weather radar system, wherein the radar returns comprise at least one of horizontal radar scan data and vertical radar scan data;
determining radar reflectivity from the radar returns;
determining, using at least one of the horizontal radar scan data and the vertical radar scan data, (a) areas of radar reflectivity and (b) a temperature associated with the areas of radar reflectivity;
estimating a lightning flash rate using the radar reflectivity, areas of radar reflectivity, and temperature associated with the areas of radar reflectivity determined using at least one of the horizontal scan data and the vertical scan data;
displaying weather radar information on a display of the aircraft; and
wherein the weather radar information is adjusted on the display based on the lightning flash rate.

22. The computer-readable medium of claim 21, wherein adjusting the display based on the lightning flash rate comprises:
    mapping lightning flash rates to a convective level;
    mapping the convective level to a color coding scheme; and
    adjusting the color of areas on the display based upon the color coding scheme.

* * * * *